US009888490B2

(12) United States Patent
Wang et al.

(10) Patent No.: US 9,888,490 B2
(45) Date of Patent: Feb. 6, 2018

(54) METHOD FOR COORDINATING BEACON TRANSMISSION TIMES IN WIRELESS LOCAL AREA NETWORK AND COMMUNICATIONS SYSTEM UTILIZING THE SAME

(71) Applicant: MediaTek Singapore Pte. Ltd., Singapore (SG)

(72) Inventors: Chao-Chun Wang, Taipei (TW); Chi-Shi Yee, Baoshan, Township, Hsinchu County (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 66 days.

(21) Appl. No.: 14/372,762

(22) PCT Filed: Jan. 18, 2013

(86) PCT No.: PCT/CN2013/070642
§ 371 (c)(1),
(2) Date: Jul. 17, 2014

(87) PCT Pub. No.: WO2013/107370
PCT Pub. Date: Jul. 25, 2013

(65) Prior Publication Data
US 2014/0355576 A1 Dec. 4, 2014

Related U.S. Application Data

(60) Provisional application No. 61/587,952, filed on Jan. 18, 2012.

(51) Int. Cl.
*H04W 48/12* (2009.01)
*H04W 48/16* (2009.01)
(Continued)

(52) U.S. Cl.
CPC ....... *H04W 72/1263* (2013.01); *H04W 48/12* (2013.01); *H04W 48/16* (2013.01); *H04W 84/12* (2013.01)

(58) Field of Classification Search
None
See application file for complete search history.

(56) References Cited

U.S. PATENT DOCUMENTS 5,692,127 A * 11/1997 Devon ............... H04B 14/026
340/12.17
7,567,540 B2 * 7/2009 Sakoda ............... H04W 48/08
370/328

(Continued)

FOREIGN PATENT DOCUMENTS

CN 101326779 12/2008
EP 1 463 242 9/2004

(Continued)

OTHER PUBLICATIONS

International Search Report dated Apr. 18, 2013.
English language translation of abstract of CN 101326779 (published Dec. 17, 2008).

*Primary Examiner* — Ayaz Sheikh
*Assistant Examiner* — Tarell Hampton
(74) *Attorney, Agent, or Firm* — McClure, Qualey & Rodack, LLP

(57) ABSTRACT

A method for coordinating beacon transmission times for a plurality of access points (APs) in a wireless local area network includes generating a first neighboring AP list listing one or more neighboring AP(s) of a first AP, deriving a first beacon transmission time for the first AP according to the first neighboring AP list, and transmitting a beacon message at the first beacon transmission time by the first AP. The first AP and the one or more neighboring AP(s) are arranged to form a Hot Spot that offers network services over the wireless local area network.

9 Claims, 4 Drawing Sheets

(51) Int. Cl.
*H04W 72/12* (2009.01)
*H04W 84/12* (2009.01)

(56) References Cited

U.S. PATENT DOCUMENTS

| | | |
|---|---|---|
| 7,733,842 B2 | 6/2010 | Yang et al. |
| 2006/0268746 A1* | 11/2006 | Wijting ................. H04W 48/08 370/254 |
| 2007/0014269 A1 | 1/2007 | Sherman et al. |
| 2007/0049339 A1* | 3/2007 | Barak .................... H04W 88/06 455/557 |
| 2007/0165589 A1* | 7/2007 | Sakoda ............. H04W 72/0446 370/345 |
| 2008/0198811 A1 | 8/2008 | Deshpande et al. |
| 2008/0205340 A1 | 8/2008 | Meylan et al. |
| 2008/0259877 A1* | 10/2008 | Habetha .............. H04W 74/002 370/336 |
| 2011/0026472 A1* | 2/2011 | Reumerman ......... H04W 72/02 370/329 |

FOREIGN PATENT DOCUMENTS

| | | |
|---|---|---|
| EP | 1 626 529 | 2/2006 |
| EP | 2 026 621 | 2/2009 |
| WO | WO 2007/063427 | 6/2007 |
| WO | 2011097417 A1 | 8/2011 |

\* cited by examiner

METHOD FOR COORDINATING BEACON TRANSMISSION TIMES IN WIRELESS LOCAL AREA NETWORK AND COMMUNICATIONS SYSTEM UTILIZING THE SAME

CROSS REFERENCE TO RELATED APPLICATIONS

This application is a National Phase of PCT/CN2013/070642, filed Jan. 18, 2013, which claims the benefit of U.S. Provisional Application No. 61/587,952 filed Jan. 1, 2012 and entitled "Cooperative AP Discovery". The contents of these priority applications are hereby incorporated by reference.

TECHNICAL FIELD

The invention relates to a method for a plurality of APs to discover neighboring APs of the same hotspot and self-coordinate beacon transmission times.

BACKGROUND

Wi-Fi Hot Spot is a site that offers network services over a wireless local area network for mobile users. A typical Wi-Fi Hot Spot has more than one access point (AP) occupying a wireless channel Wi-Fi Hot Spot is generally set up at train stations, shops, companies, department stores, or the likes. When one or more mobile wireless devices (called stations, STA) enter a coverage area of a Hot Spot, it has to associate with an AP which provides the service. There are two ways, active scanning and passive scanning, for an STA to discover an AP which will provide the service.

For active scanning, an STA searches APs by broadcasting one or more request messages, for example, the probe request message defined in the IEEE 802.11 standards. The APs receiving the broadcasted request messages will respond by returning a response message, for example, the probe response message in the IEEE 802.11 standards.

By using active scanning for AP discovery, one of the problems is that it will potentially create a broadcast storm. Assuming there are n STAs entering a Hot Spot area within a brief interval where the Hot Spot has m APs. If every STA sends at least one request message which is received by all APs and every AP returns at least one response message, there are at least (n×m) messages generated in the active scanning process. The time for transmitting the message and the time it takes to compete for the channel access cause lots of overhead.

An alternative approach is passive scanning. In passive scanning, an STA switches to each available channel and listens to beacon messages, management messages transmitted by an AP. In general, each AP sends a beacon message every 100 ms. If APs on the same wireless channel are uncoordinated, it is possible that two or more APs send beacon messages at the same time and end up colliding with each other without knowing about it. In addition, even with multiple APs, an STA may still have to wait for nearly a 100 ms in a worst case.

Therefore, a method for a plurality of APs to efficiently coordinate beacon transmission times to achieve a goal of fast link set up is required.

SUMMARY

Communications systems and methods for coordinating beacon transmission times for a plurality of access points (APs) in a wireless local area network are provided. An exemplary embodiment of a method for coordinating beacon transmission times for a plurality of access points (APs) in a wireless local area network comprises: generating a first neighboring AP list including one or more neighboring AP(s) of a first AP, wherein the first AP and the one or more neighboring AP(s) are arranged to form a Hot Spot that offers network services over the wireless local area network; deriving a first beacon transmission time for the first AP according to the first neighboring AP list; and transmitting a beacon message at the first beacon transmission time by the first AP.

An exemplary embodiment of a communications system with a plurality of access points (APs) forming a Hot Spot that offers network services over a wireless local area network comprises a first AP and a second AP. The first AP generates a first neighboring AP list listing one or more neighboring AP(s) of the first AP, derives a first beacon transmission time according to the first neighboring AP list, and transmits a first beacon message at the first beacon transmission time. The second AP receives the first beacon message, derives a second beacon transmission time according to the first beacon message so as to coordinate beacon transmission times between the plurality of APs, and transmits a second beacon message at the second beacon transmission time.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

As discussed above, possible beacon message collisions and long waiting times are the drawbacks when using passive scanning for an STA to discover an AP of a Wi-Fi Hot Spot. In the present invention, methods for coordinating the beacon transmission times for a plurality of access points (APs) in a wireless local area network are proposed. Based on the proposed methods, the time required for an STA to associate with an AP is greatly reduced and the beacon message collision problem is solved as compared with conventional passive scanning mechanisms. In addition, unlike the conventional passive scanning mechanism, in the proposed methods, there is no need to introduce a dedicated control entity for coordinating between the beacon transmission times. In other words, the beacon transmission times will be self-coordinated among the APs after several beacon intervals based on the proposed methods.

Figure 1:
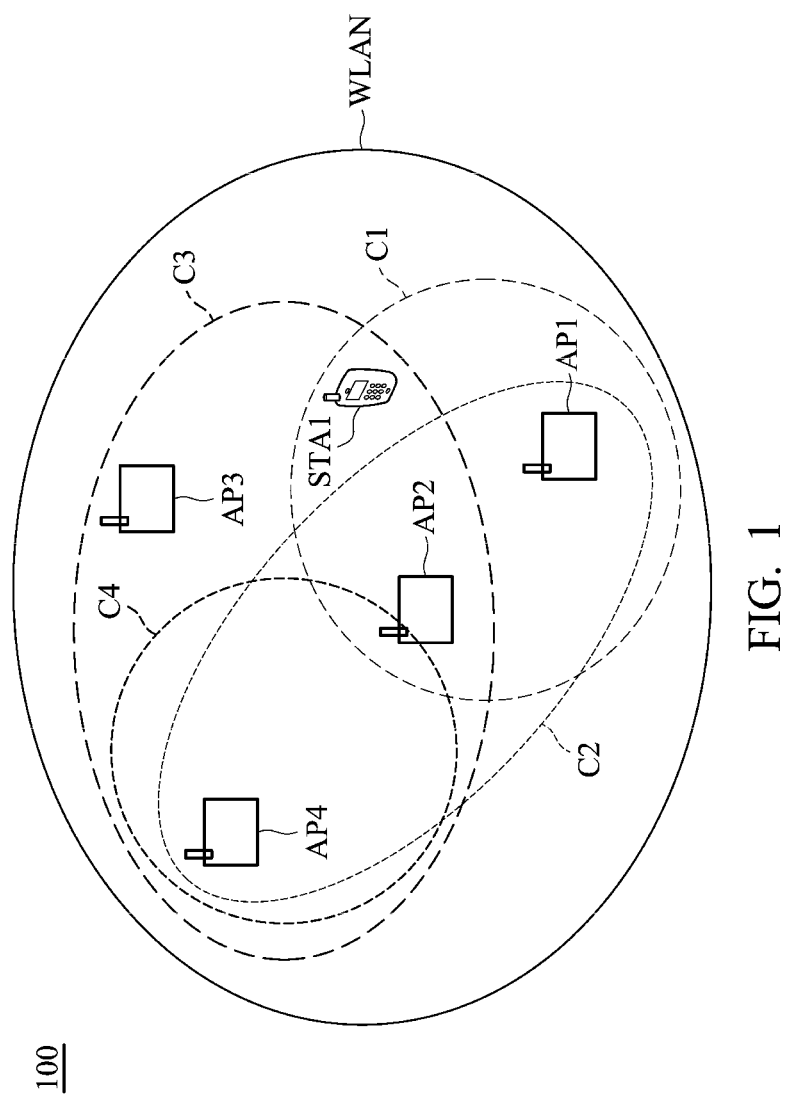
FIG. 1 is a schematic diagram showing a communications system according to an embodiment of the invention.

FIG. 1 is a schematic diagram showing a communications system according to an embodiment of the invention. According to an embodiment of the invention, there may be a plurality of access points (APs), such as the access points AP1~AP4 shown in FIG. 1, in the communications system 100. The plurality of APs may be arranged to form a Hot Spot that offers network services over a wireless local area network WLAN. Generally, the plurality of APs may have identical SSIDs (Service Set Identification), but different BSSIDs (Basic Service Set Identification). The plurality of APs may occupy a same wireless channel. For example, one of the Wi-Fi channels 1~11, or others. Each AP may have different coverage areas. Once a station, such as the station STA1 shown in FIG. 1, enters the coverage area of the wireless local area network WLAN, the station STA1 may perform passive scanning by waiting for one or more beacon messages, so as to discover and further associate with an AP which will provide the best service.

Figure 2:
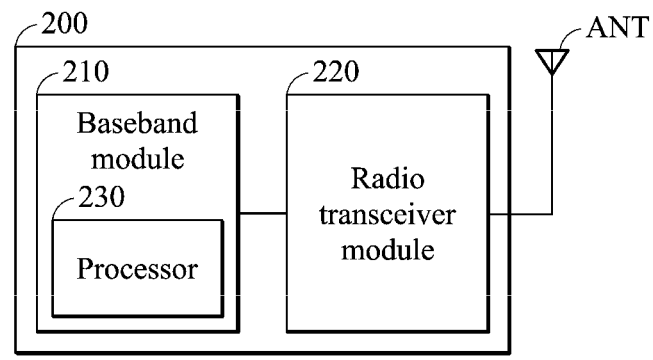
FIG. 2 shows a simplified block diagram of a communications apparatus according to an embodiment of the invention.

FIG. 2 shows a simplified block diagram of a communications apparatus according to an embodiment of the invention. The communications apparatus 200 may be an access point or a station in the wireless local area network WLAN as shown in FIG. 1. According to an embodiment of the invention, the communications apparatus 200 may comprise a baseband module 210, a radio transceiver module 220 and an antenna ANT. The baseband module 210 may be arranged for processing baseband signals. The baseband module 210 may convert the baseband signals to a plurality of digital signals, and process the digital signals, and vice versa. The baseband module 210 may comprise a plurality of hardware devices to perform baseband signal processing. The baseband signal processing may comprise analog to digital conversion (ADC)/digital to analog conversion (DAC), gain adjustment, modulation/demodulation, encoding/decoding, and so on. The baseband module 210 may further comprise memory devices (not shown) and a processor 230 for controlling the operations of the baseband module 210 and radio transceiver module 220.

The radio transceiver module 220 may receive RF signals, convert the received signals to baseband signals to be processed by the baseband module 210, or receive baseband signals from the baseband module 210 and convert the received signals to RF signals to be transmitted. The radio transceiver module 220 may comprise a plurality of hardware devices to perform radio frequency conversion. For example, the radio transceiver module 220 may comprise a mixer to multiply the baseband signals with a carrier oscillated in a predetermined radio frequency.

Note that in the following paragraphs, the methods for coordinating the beacon transmission times to be introduced may be implemented in any of numerous ways. For example, the embodiments of the methods may be implemented using software, firmware, or a combination thereof, and executed by the processor 230. It should be appreciated that any component or collection of components that perform the functions of the proposed methods can be generically considered as one or more dedicated hardware devices that control the above discussed function. Note further that in order to clarify the concept of the invention, FIG. 2 presents a simplified block diagram, in which only the elements relevant to the invention are shown. However, note that the invention should not be limited what is shown on the FIG. 2.

Based on a concept of the invention, one way to reduce the waiting time for beacon messages is for all APs to coordinate their time to transmit beacon messages. In a preferred embodiment of the invention, the APs transmit beacon messages at an evenly spaced time slot. For example, a first AP sends a beacon at time t, and a second AP sends a beacon message at time (t+beacon interval/m), a third AP send beacon at time (t+2*beacon interval/m), and so forth, where the beacon interval may be 100 ms, and m is the total number of APs set up in the wireless local area network to form the Hot Spot. Therefore, the proposed methods may reduce the waiting time for receiving a beacon message from a worst case of about one beacon interval to (beacon interval/m).

According to an embodiment of the invention, there are two phases covered in the application, an AP discovery phase and an AP coordination phase. In the AP discovery phase, each AP in the wireless local area network may try to discover all the APs in the wireless local area network, including the hidden AP(s) that is/are located in the wireless local area network but beyond the coverage of the AP. In the AP coordination phase, the beacon transmission times are coordinated among the APs in accordance with a first predetermined rule. The AP discovery phase and AP coordination phase are discussed in more detail in the following paragraphs.

In the beginning of the AP discovery phase, each AP in the wireless local area network may send its beacon messages in accordance with its own schedule and receive beacon messages from other APs. For example, each AP may have its own target beacon transmission time (TBTT), and may transmit its beacon message at its own TBTT. The APs may generate or build a neighboring AP list listing one or more neighboring AP(s) in the wireless local area network by using the received beacon messages. The beacon message sent by an AP may carry the neighboring AP list of that AP. The neighboring AP list may comprise information regarding the neighboring AP's BSSID. Therefore, according to an embodiment of the invention, when receiving the beacon messages from other APs, an AP may compare its own neighboring AP list with the received neighboring AP lists. If the lists are different, it indicates that some APs are hidden from each other.

Here, the hidden AP means the AP that is located in the wireless local area network but beyond the coverage of another AP. For example, as shown in FIG. 1, the dotted circle C1 represents a coverage area of the access point AP1, the dotted circle C2 represents a coverage area of the access point AP2, the dotted circle C3 represents a coverage area of the access point AP3, and the dotted circle C4 represents a coverage area of the access point AP4. Since the access points AP3 and AP4 are located beyond the coverage area of the access point AP1, the access points AP3 and AP4 are the hidden nodes (that is, hidden APs) of the access point AP1.

Since the access points AP3 and AP4 are the hidden nodes (that is, hidden APs) of the access point AP1, the access point AP1 may not receive the beacon messages from the hidden access points AP3 and AP4. Therefore, the access point AP1 may not be aware of the existence of the access points AP3 and AP4. To solve this problem, according to an embodiment of the invention, the access point AP1 may obtain information regarding the hidden access points AP3 and AP4 from the other access points (such as access point AP2) or stations (such as station STA1). For example, the access point AP1 may obtain a neighboring AP list of the access point AP2 from the beacon message transmitted by the access point AP2, and compare its own neighboring AP list with the received neighboring AP list and find out the hidden access point AP4.

For another example, the access point AP1 may also receive a response message from station STA1 which receives the beacon message sent by the access point AP1, obtain a discovered AP list listing one or more AP(s) discovered by the station STA1 from the response message and compare its own neighboring AP list with the received discovered AP list and find out the hidden access point AP3. When a station enters the wireless local area network and starts passive scanning, the station receives beacon messages from the APs in the wireless local area network and compiles its own discovered AP list by using the information received from the beacon messages. The station may further compare it own discovered list with the neighboring AP list received in the one or more beacon messages.

According to an embodiment of the invention, the station may send a unicast probe request message carrying information regarding the hidden AP to an AP having a neighboring AP list that is different from the STA discovered AP list. The information carried by the station may be the discovered AP list of the station or the BSSID of the hidden AP. According to another embodiment of the invention, the station may also send a broadcast probe request message carrying information regarding the hidden AP. In this manner, upon receiving the broadcast probe request message, an AP which can not see the hidden AP may be aware of the existence of the hidden AP.

Once the hidden access point(s) have been found, according to an embodiment of the invention, the access point AP1 may further update its own neighboring AP list so as to add the hidden access points (such as AP3 and AP4) to its own neighboring AP list. Note that the access point AP1 may also alternatively generate another list, such as a hidden neighboring AP list, for listing the hidden access points. The concept of collecting information regarding all the access points in the wireless local area network may be implemented in any of numerous ways, and therefore, the invention should not be limited thereto.

Since the hidden access point(s) may be found via the beacon message received from other access point(s) and the response message received from one or more stations, at the end of the AP discovery phase, all APs may have the same information of all APs in the wireless local area network.

After collecting information regarding all the APs in the wireless local area network, the AP coordination phase may begin. According to an embodiment of the invention, each AP in the wireless local area network may individually derive a corresponding beacon transmission time thereof according to its own neighboring AP list, and then try to transmit a beacon message at the corresponding beacon transmission time. Assuming that there are m APs in a Hot Spot that offers network services over a wireless local area network, in one embodiment of the invention, according to the first predetermined rule, a span between the beacon messages transmitted by different APs will be self-coordinated to be about one beacon interval/m (for example, 100 ms/m), which is much less than one beacon interval. Take the communications system as shown in FIG. 1 as an example, there are four APs in the wireless local area network WLAN, and the beacon messages will be transmitted by different APs about every (beacon interval/4).

To be more specific, according to an embodiment of the first predetermined rule, the APs in the wireless local area network may equally divide a beacon interval (for example, 100 ms) by a total number of APs m in the wireless local area network to obtain a plurality of segments. Note that information regarding the total number of APs in the wireless local area network may be obtained from the neighbor AP list as generated or built in during the AP discovery phase. For example, the total number of APs in the wireless local area network may be derived by a total number of APs in the neighboring AP list plus one (the AP itself). Next, the APs may further select a predetermined segment from the plurality of segments by choosing one segment, wherein the original target beacon transmission time (TBTT) falls, and determine a time within the predetermined segment as the beacon transmission time.

Figure 3:
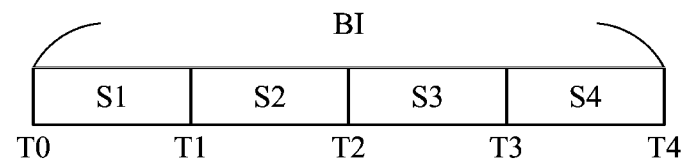
FIG. 3 is a schematic diagram showing a concept of scheduling the transmission of the beacon messages for different APs according to an embodiment of the invention.

FIG. 3 is a schematic diagram showing a concept of scheduling the transmission of the beacon messages for different APs according to an embodiment of the invention. Take the communications system as shown in FIG. 1 as an example, since there are four APs in the wireless local area network WLAN, the beacon interval BI may be divided into four segments S1, S2, S3 and S4 as shown in FIG. 3. Suppose that the original target beacon transmission time (TBTT) of the access point AP1 is determined to fall within the first segment S1, the access point AP1 may then determine a time; within the segment S1 as its beacon transmission time. According to an embodiment of the invention, the access point AP1 may randomly determine a back-off time from the beginning time T0 of the segment S1, and then transmit a beacon message after the random back-off time.

Once receiving the beacon message transmitted by the access point AP1, the remaining APs may further delay the transmission of their beacon messages to avoid collision. According to an embodiment of the invention, the remaining APs may determine their beacon transmission times in a similar way. For example, suppose that the original target beacon transmission time (TBTT) of the access point AP2 is determined to fall within the second segment S2, the access point AP2 may then determine a time within the segment S2 as the its beacon transmission time. According to an embodiment of the invention, the access point AP2 may randomly determine a back-off time from the beginning time T1 of the segment S2, and then transmit a beacon message at the determined time within the segment S2. The beacon transmission time of the access points AP3 and AP4 may also be determined in a similar way.

For the case when two or more APs select the same segment, according to the embodiments of the invention, collision may still be avoided in accordance with a second predetermined rule. Continuing the example as illustrated above, suppose that the original target beacon transmission time (TBTT) of the access points AP3 and AP4 are both determined to fall within the third segment S3, since the access points AP3 and AP4 may randomly determine a back-off time from the beginning time T2 of the segment S3, the chance of collision can be reduced exponentially. To be more specific, suppose that the access point AP4 receives a beacon message from the access point AP3 during the segment S3 before transmitting its beacon message, the access point AP4 may give up transmitting its beacon message during the segment S3. According to the second predetermined rule, the access point AP4 may give up transmitting its beacon message during the segment S3 and select another segment, such as a time slot in segment S4 by randomly determine a back-off time from the beginning time T3 of the segment S4, and then transmit its beacon message at the determined time within the segment S4.

According to an embodiment of the invention, the APs may divide the beacon interval into m parts, and each AP selects its own TBTT within the beacon interval. For example, an AP may choose to transmit the beacon at time T0, as shown in FIG. 3, while another AP may choose to delay its TBTT to time T2. The difference between T0 and T2 may be 2*(beacon interval/m). If two of the APs choose the same point of time to transmit the beacon, they may use the method described above to choose a new one.

In brief, based on the second predetermined rule, once an AP detects that another AP is transmitting a beacon message at its scheduled segment, it will change its beacon message transmission time to another segment.

According to an embodiment of the invention, since there are m APs set up in the wireless local area network, each AP is expected to receive (m−1) beacon messages. There are two reasons that an AP receives less than (m−1) beacon messages, the first one is that another AP is hidden from the AP and the second reason is that there are there are two APs transmit beacon messages at the same time slot, which causes collision.

For the first case, since each AP knows who is hidden from it, when an AP sees all the beacon messages from its neighboring APs and the number of beacon messages it fails to receive is the same as the number of hidden APs, the APs are self-coordinated from its perspective. The information of hidden APs can be obtained by comparing its own neighboring AP list with the neighboring AP lists received from other APs and/or the discovered AP lists or hidden AP information received from the STAs as previously discussed.

By ignoring the case of hidden APs, when an AP still fails to receive beacon message(s) from the at least one of its neighboring AP which is not hidden from it, it can deduce that their beacon messages must be colliding with each other.

To solve the collision problem, according to an embodiment of the invention, since the back-off time within a predetermined segment is randomly determined based on a random seed, the AP may change the random seed and try to determine another time to transmit its beacon message. By changing the back-off time randomly with a different random seed, the probability of the two APs continuing to send beacon messages about the same time can be reduced exponentially. Once one of the APs receives another beacon message from another AP, it will change its beacon message transmission time to another scheduled segment as previously discussed, and the collision problem would be solved.

Note that when an AP fails to receive beacon messages in more than one segment, the same procedure may still be applied and the beacon transmission times for different APs will be self-coordinated after several beacon intervals.

Figure 4:
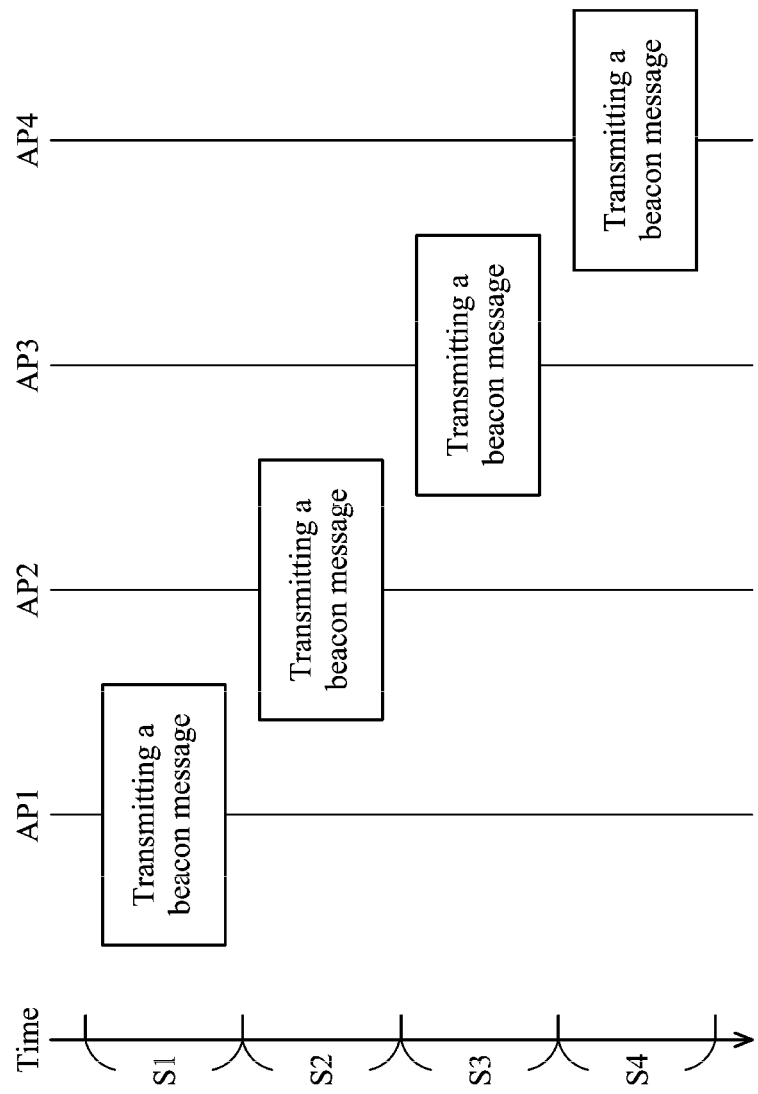
FIG. 4 is an exemplary message flow showing a self-coordinated beacon message transmission among multiple access points according to an embodiment of the invention.

FIG. 4 is an exemplary message flow showing a self-coordinated beacon message transmission among access points AP1~AP4 according to an embodiment of the invention. By applying the AP coordination methods as discussed above, after several beacon intervals, the beacon transmission times for the access points AP1~AP4 are self-coordinated and evenly distributed in the four segments S1~S4. The access points AP1~AP4 may then take turns to transmit their beacon messages in a deterministic order as shown in FIG. 4 after the AP coordination phase.

Figure 5:
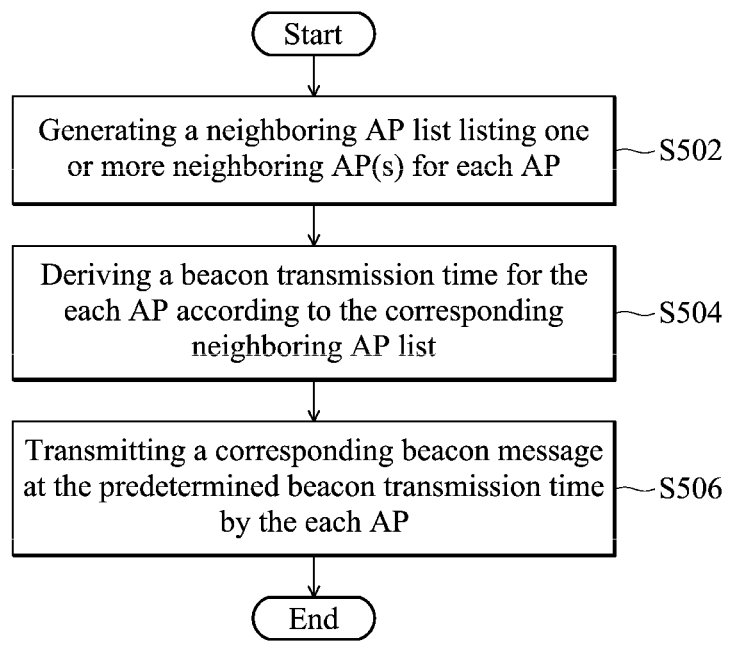
FIG. 5 is a flow chart showing a method for coordinating beacon transmission times for a plurality of access points in a wireless local area network according to an embodiment of the invention.

FIG. 5 is a flow chart showing a method for coordinating beacon transmission times for a plurality of access points in a wireless local area network according to an embodiment of the invention. To begin, a neighboring AP list listing one or more neighboring AP(s) for each AP is generated (Step S502). The neighboring AP list for each AP may be generated in the AP discovery phase as discussed above. Next, a beacon transmission time for the each AP is derived according to the corresponding neighboring AP list (Step S504). The beacon transmission time for the each AP may be derived based on the first and second predetermined rules in the AP coordination phase as discussed above. Finally, a corresponding beacon message is transmitted at the predetermined beacon transmission time by the each AP (Step S506). In a preferred embodiment, the APs may take turns to transmit its beacon message about every (beacon interval/m), where m is the total number of APs in the wireless local area network.

As discussed above, based on the proposed methods, the time required for an STA to associate with an AP is greatly reduced and the beacon message collision problem is solved as compared with the conventional passive scanning mechanism. In addition, unlike the conventional passive scanning mechanism, in the proposed methods, there is no need to introduce a dedicated control entity for coordinating the beacon transmission times. In other words, the beacon transmission times will be self-coordinated among the APs after several beacon intervals based on the proposed methods. In addition, the proposed methods are very simple and easy to be implemented, and the proposed methods may be directly supported by the currently defined protocols so that there is no need to modify the existing protocols and standards.

While the invention has been described by way of example and in terms of preferred embodiment, it is to be understood that the invention is not limited thereto Those who are skilled in this technology can still make various alterations and modifications without departing from the scope and spirit of this invention. Therefore, the scope of the present invention shall be defined and protected by the following claims and their equivalents.

The invention claimed is:

1. A method for coordinating beacon transmission times for a plurality of access points (APs) in a wireless local area network, comprising:
    generating a first neighboring AP list listing one or more neighboring AP(s) of a first AP, wherein the first AP and the one or more neighboring AP(s) are arranged to offer network services;
    deriving a first beacon transmission time for the first AP according to the first neighboring AP list;
    transmitting a beacon message at the first beacon transmission time by the first AP;
    receiving at least one probe response message from at least one station receiving the beacon message and using the network service provided by the first AP, wherein the at least one response message comprises a discovered AP list listing one or more AP(s) discovered by the station;
    comparing the first neighboring AP list with the discovered AP list; and
    updating the first neighboring AP list according to the comparison,
    wherein the at least one station is associated with at least one of the plurality of APs.

2. The method as claimed in claim 1, wherein the first neighboring AP list further lists one or more hidden AP(s) that is/are located in the wireless local area network but beyond coverage area of the first AP.

3. The method as claimed in claim 1, wherein the first AP and the one or more neighboring AP(s) occupy a same wireless channel.

4. The method as claimed in claim 1, wherein the step of generating the first neighboring AP list further comprises:
receiving a beacon message from at least one of the one or more neighboring AP(s); and
generating the first neighboring AP list based on the received beacon message.

5. The method as claimed in claim 4, further comprising:
comparing the first neighboring AP list with a second neighboring AP list obtained from the received beacon message; and
updating the first neighboring AP list according to the comparison.

6. The method as claimed in claim 1, wherein a span of the first beacon transmission time and the second beacon transmission time is less than one beacon interval.

7. A communications system with a plurality of access points (APs) forming a Hot Spot that offers network services over a wireless local area network, comprising:
a first AP, generating a first neighboring AP list listing one or more neighboring AP(s) of the first AP, deriving a first beacon transmission time according to the first neighboring AP list, and transmitting a first beacon message at the first beacon transmission time; and
a second AP, receiving the first beacon message, deriving a second beacon transmission time according to the first beacon message so as to coordinate beacon transmission times between the plurality of APs, and transmitting a second beacon message at the second beacon transmission time,
wherein the first AP further receives at least one probe response message from at least one station in the wireless local area network receiving the first beacon message and using the network service provided by the first AP, wherein the at least one response message comprises a discovered AP list listing one or more AP(s) discovered by the station, so as to find out one or more hidden AP(s) that is/are located in the wireless local area network but beyond coverage area of the first AP, compares the first neighboring AP list with the discovered AP list, and updates the first neighboring AP list according to the comparison so as to add the one or more hidden AP(s) in the first neighboring AP list,
wherein the at least one station is associated with at least one of the plurality of APs.

8. The communications system as claimed in claim 7, wherein the first AP further receives the second beacon message, compares the first neighboring AP list with a second neighboring AP list obtained from the second beacon message so as to find out one or more hidden AP(s) that is/are located in the wireless local area network but beyond coverage area of the first AP, and updates the first neighboring AP list according to the comparison so as to add the one or more hidden AP(s) in the first neighboring AP list.

9. The communications system as claimed in claim 7, wherein the second AP further generates a second neighboring AP list listing one or more neighboring AP(s) of the second AP, compares the second neighboring AP list with the first neighboring AP list obtained from the first beacon message so as to find out one or more hidden AP(s) that is/are located in the wireless local area network but beyond coverage area of the second AP, updates the second neighboring AP list according to the comparison so as to add the one or more hidden AP(s) in the second neighboring AP list and derives the second beacon transmission time according to the second neighboring AP list.

* * * * *